United States Patent [19]

Walter

[11] Patent Number: 5,107,982
[45] Date of Patent: Apr. 28, 1992

[54] CONVEYOR APPARATUS
[75] Inventor: Brian D. Walter, Huntington, Ind.
[73] Assignee: Shuttleworth, Inc., Huntington, Ind.
[21] Appl. No.: 645,825
[22] Filed: Jan. 25, 1991
[51] Int. Cl.[5] ............................................. B65G 13/06
[52] U.S. Cl. .................................. 198/781; 198/787; 198/789
[58] Field of Search ...................... 198/781, 787, 789

[56] References Cited

U.S. PATENT DOCUMENTS

| | | |
|---|---|---|
| 3,369,646 | 2/1968 | Musser . |
| 3,724,643 | 4/1973 | Kohl .................................. 198/787 |
| 3,951,255 | 4/1976 | Shuttleworth et al. . |
| 3,961,700 | 6/1976 | Fleischauer . |
| 4,006,815 | 2/1977 | Werntz ............................. 198/781 |
| 4,193,492 | 3/1980 | Hammond ........................ 198/781 |
| 4,221,288 | 9/1980 | Rae .................................. 198/781 |
| 4,325,474 | 4/1982 | Rae . |
| 4,401,208 | 8/1983 | Allmacher, Jr. . |
| 4,406,360 | 9/1983 | Smith et al. ...................... 198/781 |
| 4,421,224 | 12/1983 | Dingman .......................... 198/781 |
| 4,488,639 | 12/1984 | Vogt et al. ..................... 198/789 X |
| 4,524,861 | 6/1985 | Matsushita ....................... 198/781 |
| 4,753,339 | 6/1988 | Vogt et al. ....................... 198/781 |
| 4,815,588 | 3/1989 | Katsuragi et al. ................ 198/781 |
| 4,993,541 | 2/1991 | Roh .................................. 198/781 |

*Primary Examiner*—D. Glenn Dayoan
*Attorney, Agent, or Firm*—Woodard, Emhardt, Naughton, Moriarty & McNett

[57] ABSTRACT

A roller conveyor apparatus includes a plurality of tapered tubular rollers, each rotatably mounted on an axle. The roller axles are supported by a frame so that, in one embodiment, the rollers are arranged to form a conveyor turn segment. A drive wheel, also mounted on the axle, is associated with each roller to provide a friction surface operating against one end of the roller for rotation of the roller. A spring load assembly at the other end of the roller controls the frictional contact between the roller and the drive wheel. The drive wheel for each of the plurality of rollers is driven by a friction drive assembly including a sprocket horizontally supported beneath the drive wheel. A drive tire is mounted on the sprocket so that the tire surface contacts the drive wheel. A chain, driven by a single motor and drive sprocket, engages the sprocket of each friction drive assembly to rotate the sprocket, and therefore the drive tire. The frictional contact between the drive tire and the drive wheel causes the drive wheel to also rotate. The frictional contact between the drive wheel and the roller, and between the drive tire and the drive wheel, provide two torque limiting features for the roller conveyor apparatus of one embodiment of the invention. In one embodiment, the drive wheel is press-fit onto the axle so that the axle rotates with the drive wheel. Axle rotation provides an additional driving force to the rollers through bushings engaged with the rollers.

12 Claims, 4 Drawing Sheets

CONVEYOR APPARATUS

BACKGROUND OF THE INVENTION

This invention relates to conveyor apparatus. More particularly, the invention concerns a conveyor apparatus of the powered roller type in which the rollers are individually driven.

Conveyors are typically used to move objects along different paths, often negotiating turns between feeding and removal stations. Continuous belts have been used in some applications, while other conveyors use rotatably mounted rollers. These roller conveyors may use free-wheeling rollers which depend upon the force of gravity acting on the objects to move the objects down the conveyor line. Others use rollers which are positively driven by a motor. A conveyor apparatus having positively driven rollers can be susceptible to damaging the object or rollers when the object being conveyed becomes lodged between adjacent rollers. Thus, the slip drive or slippable rollers have been used in the industry to minimize this risk of damage. Devices of this type are described in the patent to Shuttleworth, et al, U.S. Pat. No. 3,951,255, assigned to the assignee of the present invention. Other "slippable" roller devices are shown in patents to Fleischauer, U.S. Pat. No. 3,961,700, Rae, U.S. Pat. No. 4,325,474, Allmacher, Jr., U.S. Pat. No. 4,401,208, and Musser, U.S. Pat. No. 3,369,646.

Each of these prior devices have various designs and criteria. For instance, some of these devices require relatively larger roller diameters, and are therefore not readily adapted for small conveyor apparatus. Others of these devices incorporate complicated driving structures that are not readily disassembled for repair and replacement. The Fleischauer and Musser devices disclose different designs for conveyor apparatus adapted for negotiating turns. For instance, the Fleischauer device is not readily usable for sharp turning radiuses because elongated shafts using U-joint interconnections are employed. Likewise, the Musser device requires a rotating table which would tend to restrict the sharpness of the turning angle for which that device is capable. In addition, the roller spacing in both Musser and Fleischauer is often too large to permit conveying relatively small objects along the apparatus.

In view of prior art devices, there is a need in the industry for a conveyor apparatus that provides for limited torque driven rollers having the capability for negotiating sharp turning radii and for use in relatively small conveyor applications.

DESCRIPTION OF THE PREFERRED EMBODIMENTS

Figure 1:
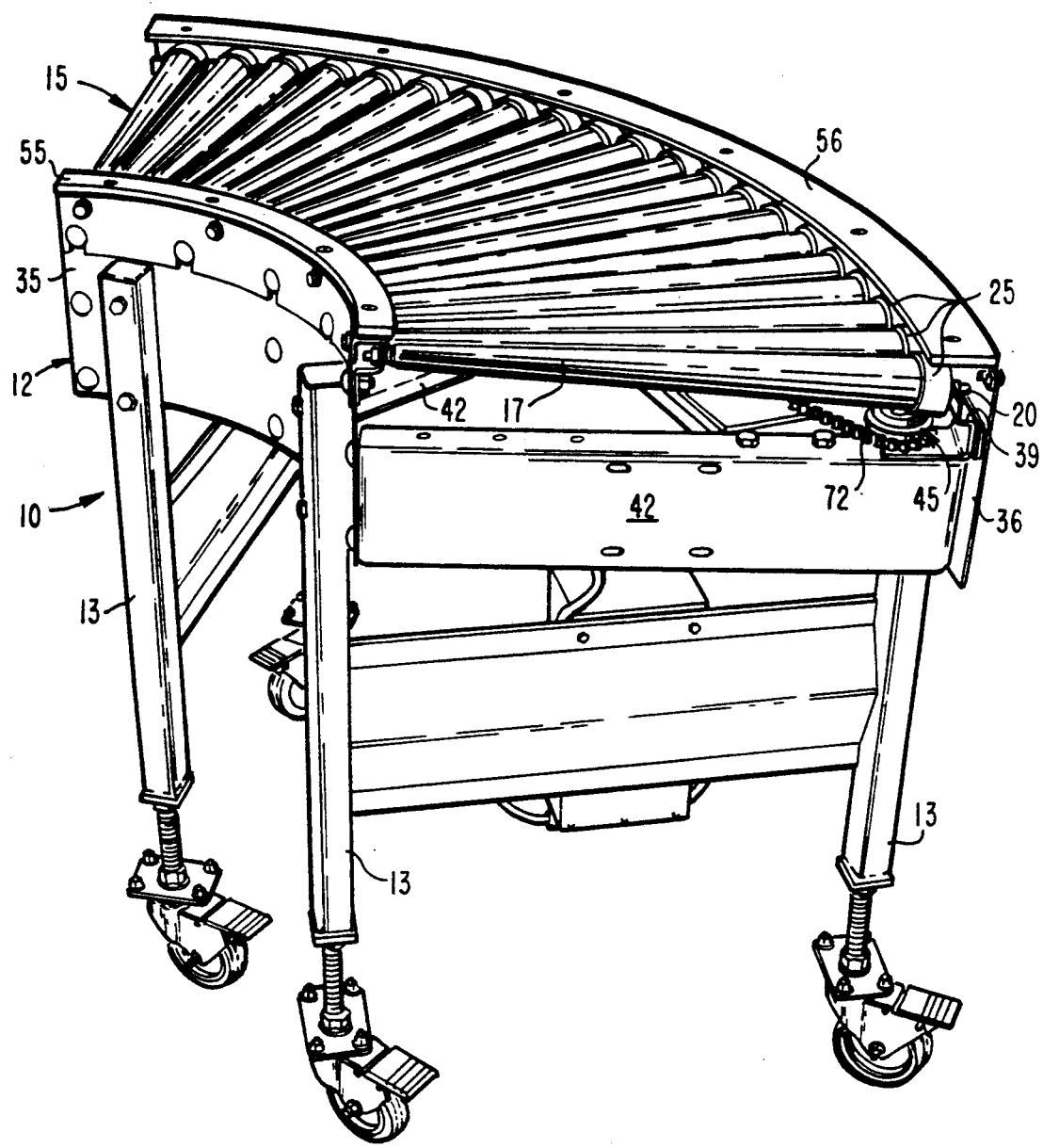
FIG. 1 is an orthographic view of the conveyor apparatus of the present invention in which a turn section of conveyor is shown.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A conveyor apparatus 10 shown in FIG. 1 includes a support frame 12 and legs 13 attached to the frame. The frame 12 supports a number of roller assemblies 15. In the present embodiment, the conveyor apparatus 10 is shown as comprising a single radius turn portion of a complete conveyor assembly. It is understood, however, that the structure and principles described herein with respect to roller conveyor apparatus 10 can be employed with multiple radius turn sections as well as with straight line sections of a conveyor system.

Figure 2:
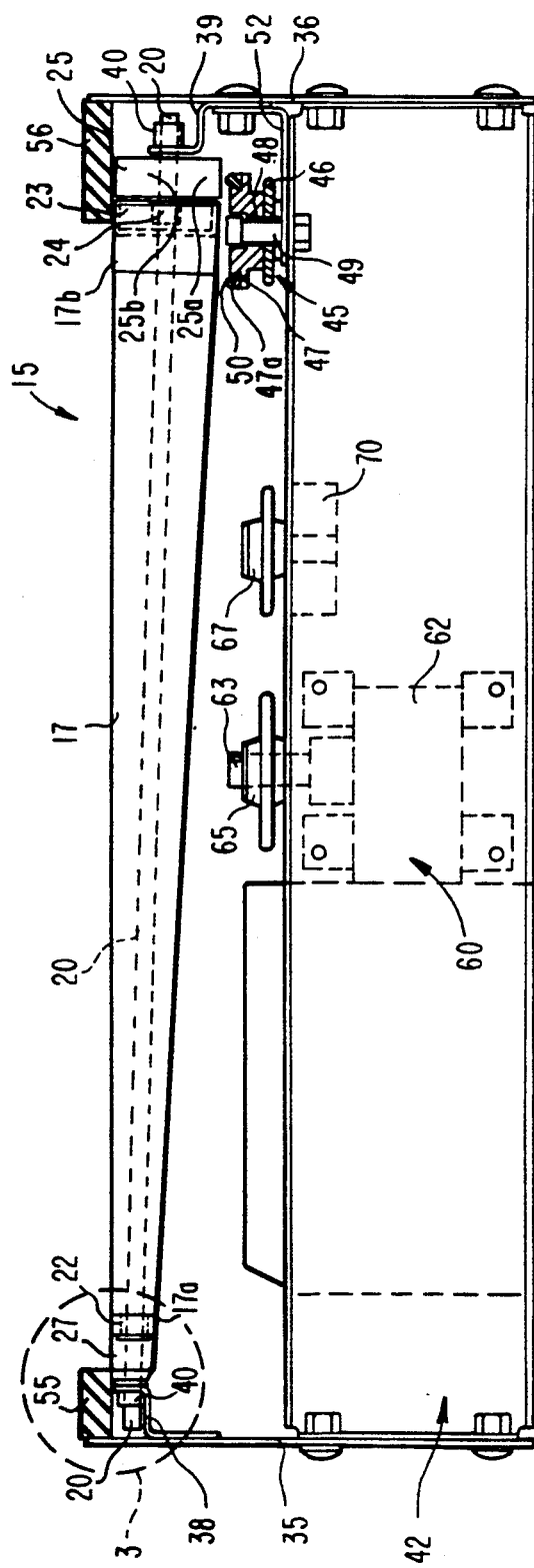
FIG. 2 is an end view of the conveyor apparatus shown in FIG. 1.

As shown in the detail view of FIG. 2, the roller assemblies 15 include a tapered tubular roller 17. An axle 20 extends through the tubular roller 17 for aligning and supporting the rollers of each roller assembly 15. The roller assemblies 15 further include a thrust bushing 22 pressed into one smaller 17a end of the tubular roller 17. A tube insert 23 is pressed into the opposite, larger end 17b of the tapered roller 17, and a second thrust bushing 24 is then pressed into the tube insert 23. The axle 20 then extends through openings in the two thrust bushings 22 and 24 to support the tubular roller 17. The axle 20 is free to rotate within the bushings 22 and 24.

Figure 3A:
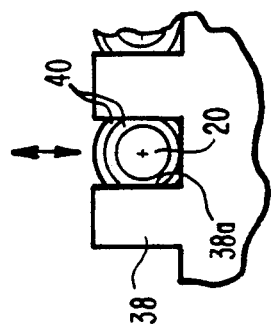
FIG. 3A is an enlarged end view of the end of the conveyor roller shown in FIG. 3 as viewed in the direction of the arrows.
Figure 3:
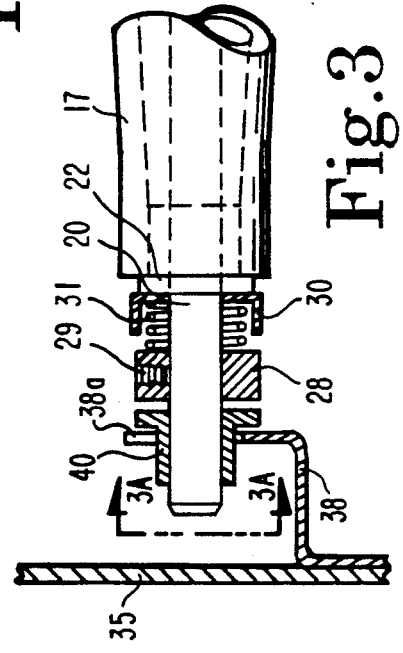
FIG. 3 is an enlarged view of one end of the conveyor roller shown in FIG. 2 as designated by the region labeled as region 3 in FIG. 2.

Means for rotating the roller about its longitudinal axis are provided that incorporate friction drive features. A drive wheel 25 is mounted on the axle 20 at the large diameter end 17b of the roller 17. A spring load assembly 27 is threaded onto the axle 20 at the smaller diameter end 17a of the tapered roller 17. The spring load assembly 27, as shown in more detail in FIG. 3, includes a collar 28 that is fixed to the axle 20 by way of a set screw 29. A spring load collar 30 is loosely threaded onto axle 20 so that the spring load collar 30 contacts the end of thrust bushing 22 at the small end 17a of the roller 17. A spring 31 is concentrically disposed about axle 20 between the collar 28 and the spring load collar 30, with the spring being held in position by the cup-shape of the spring load collar 30.

The tubular rollers 17 are loosely supported by the axle 20 so that the rollers are free to rotate relative to the axle 20. However, when the rollers 17 support an object traveling on the conveyor, the weight of the object tends to press the roller against the rotating axle 20. The product of the weight of the object and the coefficient of friction between the bushings 22/24 and the axle 20 provide the primary self-compensating driving force for the rollers 17. The amount of this primary driving force is determined by the weight of the object carried by the rollers. That is, as the weight of the object increases, the frictional driving force between the axle and the bushings increases. Thus, a low forward drive is produced for relatively lights objects and a higher drive is provided for heavier objects. It has been found that excessive forward driving force relative to the weight of the object can cause jams in curved conveyor sections. The self-compensating drive feature of the present invention matched driving force to object weight.

In some cases, additional forward driving force is required to augment the primary driving force of the axle/bushings interface. A fixed additional forward force is provided through the drive wheel 25 that does not vary with object weight. The drive wheel 25 is press-fit onto the axle 20 to rotate with the axle. Rotation of the drive wheel 25 is transmitted to rotation of the tubular roller 17 by way of frictional contact between the end face 25a of the wheel 25 and the tube insert 23 at the large diameter end 17b of the roller. The greater the frictional contact, the greater the external torque that must be exerted on the tube 17 is to cause slippage between the drive wheel 25 and the tube insert 23.

The amount of frictional engagement between these two components is controlled by the spring load assembly 27. Adjusting the location of the collar 28 relative to the spring load collar 30 controls the length of the spring 31 trapped between the two collars. The greater the compression of the spring 31, the greater force that is exerted by the spring 31 against the spring load collar 30 and against the small diameter end 17a of the roller 17. This force is then transmitted directly along the length of the roller 17 into a force from the tube insert 23 on the drive wheel 25. Varying the length or compression of the spring 31, then varies the contact force between the tube insert 23 and the drive wheel 25, and with this increased contact force, comes an increased coefficient of friction which must be overcome to permit the tubular roller 17 to slip relative to the drive wheel 25.

The support frame 12 includes an inner siderail 35 and an outer siderail 36 which form the inner and outer ends of the conveyor apparatus 10. An inner axle support 38 is affixed to the inner siderail 35, and an outer axle support 39 is mounted to the outer siderail 36. The axle 20 extends through bushings 40 which are slip-fit within openings in each of the axle supports 38 and 39. Preferably, the openings are slots, such as slot 38a in support 38 shown in the detail of FIG. 3A. When the apparatus is fully assembled, the bushing 40 is offset from the base of the slot 38a at the drive wheel end of the roller. As described herein, the drive wheel 25 is supported on a drive tire 50 (FIG. 2). However, as the drive wheel wears the bushing 40 can slide within the slot 38a to maintain the friction contact between the drive wheel 25 and the drive tire 50.

Figure 7:
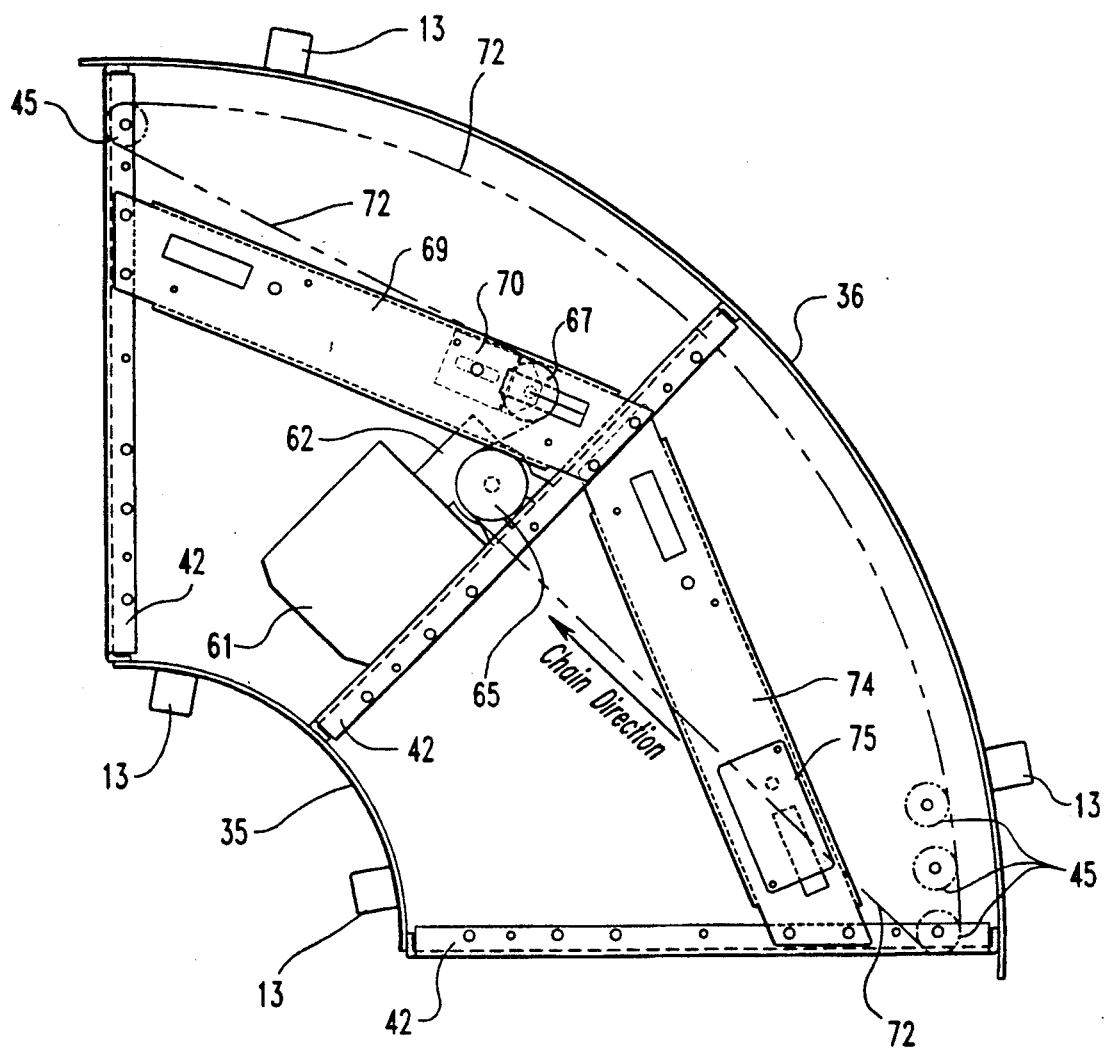
FIG. 7 is a top cutaway view of the conveyor shown in FIG. 1 with the rollers and inner and outer covers removed.

It should be noted from FIG. 2 that the axle 20 is supported at an angle relative to the horizontal of the conveyor apparatus 10. The angle of support of the axle 20 corresponds to one-half of the angle of taper of the tapered rollers 17 so that the conveying surface formed by each of the tapered rollers is a horizontal surface. However, it is understood that specific applications of the conveyor apparatus 10 of the present invention may required a non-horizontal orientation of the conveying surface, in which case the axle 20 can be supported at a suitable orientation. The siderails 35 and 36 are supported by a number of bulkheads 42 at spaced locations around the siderails as shown in FIGS. 1 and 7. The bulkheads 42 provide stability to the conveyor apparatus 10 and further support for the legs 13.

Each of the roller assemblies 15 as described thus far constitutes a roller 17 and a drive wheel 25 that are supported between two axle supports 38 and 39. The amount of frictional contact between the drive wheel 25 and the tube insert 23 of the roller 17 is determined by the spring force of spring 31 in spring load assembly 27. The driving force for driving the roller assemblies 15 is provided by friction drive assemblies 45, shown in FIGS. 2, and 4-6. In the preferred embodiment, the friction drive assemblies 45 include a driven member 46, which in this preferred embodiment constitutes a sprocket, to which a support bushing 47 is attached. The connection between the sprocket 46 and the support bushing 47 can be accomplished by a bearing sleeve 48 which is press-fit into bores within the sprocket and the support bushing. The principle objective, however, is that the sprocket 46 and support bushing 47 rotate in unison. A shoulder bolt 49 passes through the bearing sleeve 48 and is attached to a sprocket mounting plate 52, which plate is itself attached to the outer siderail 36. The action between the sprocket 46 and support bushing 47 can be maintained by the press fit of the bearing sleeve 48, or the components can be mechanically attached, such as by welding or other similar means. However, the union between the sprocket 46 and support bushing 47 may itself be a friction drive arrangement similar to that found between the drive wheel 25 and the roller 17. In this arrangement, the tightness of the shoulder bolt 49 would determine the amount of frictional contact between the sprocket 46 and the support bushing 47.

A drive member or friction drive tire 50 is supported by the upper flanged face 47a of the support bushing 47. The drive tire 50 can be resiliently engaged so that the tire 50 rotates with the support bushing 47. The friction drive assembly 45 is oriented by the sprocket mounting plate 52 so that the top face 50a (see FIG. 5) of the drive tire 50 contacts the circumferential face 25b (FIG. 2) of the drive wheel 25. Rotation of the friction drive assembly 45 causes rotation of the drive wheel 25. Thus, when the tapered tubular roller 17 encounters excessive torque, the conveyor apparatus 10 of the present invention provides two torque release mechanisms. The first torque release mechanism is between the friction drive tire 50 and the drive wheel 25, while the second mechanism is between the drive wheel 25 and the tube insert 23 of the roller 17. However, in some applications, the drive wheel 25 can be integral with the tubular roller 17, thereby eliminating the need for the spring load assembly 27. In this instance, the torque relief feature is provided simply by the friction drive assembly 45, in particular, the contact between the friction drive tire 50 and the driven portion of the tubular roller 17.

Figure 4:
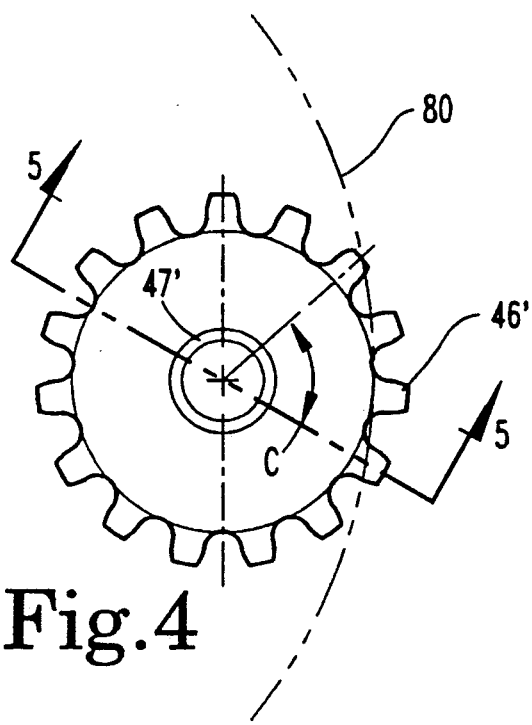
FIG. 4 is a bottom elevational view of a friction drive assembly of the conveyor apparatus show in FIGS. 1 and 2.
Figure 6:
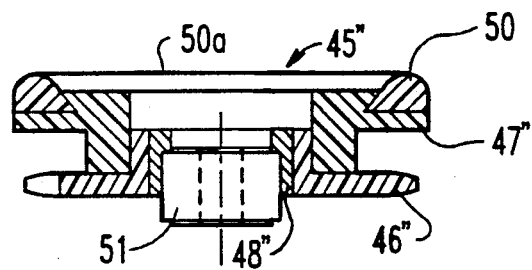
FIG. 6 is a cross sectional view of an alternative embodiment of the friction drive assembly as viewed in the same orientation as FIG. 5.
Figure 5:
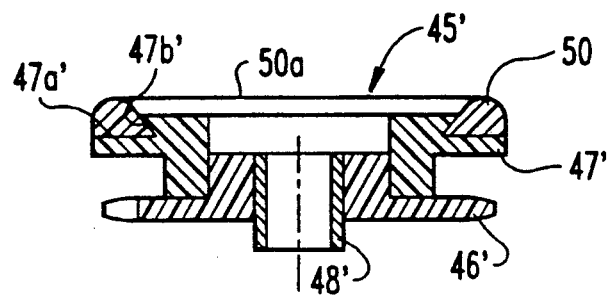
FIG. 5 is a cross sectional view of the portion of the friction drive assembly, taken along line 5—5 in FIG. 4 as view in the direction of the arrows.

Additional embodiments of the friction drive assembly 45 are shown in FIGS. 4-6. In FIG. 4, a sprocket 46' is shown which is similar to the sprocket 46 of the embodiment shown in FIG. 2. For instance, the arrangement of gear teeth of sprocket 46' is identical to the arrangement of gear teeth of sprocket 46. However, as shown in FIG. 5, the interface between the support bushing 47' and the sprocket 46' is modified. The bearing sleeve 48' is press fit only into the sprocket 46'. The support bushing 47' is press fit onto a boss formed in the sprocket 46'. The shoulder bolt 49 then passes through the bearing sleeve 48' to mount the friction drive assembly 45' to the mounting plate 52.

In another aspect of the alternative embodiment of the friction drive assembly 45', the top flange 47a' of the support bushing 47 prime forms a bevel recess 47b. This bevel recess is configured to correspond to the angled inner circumferential face 50b of the friction drive tire 50. In this manner, the drive tire 50 can be pressed onto the support busing 47' and firmly held in place. Rotation of the bushing 47' is then directly transmitted to rotation of the friction drive tire 50 without any slippage between the two components.

In the alternative embodiment shown in FIG. 6, the friction drive assembly 45" includes a sprocket 46" that has an identical tooth arrangement to the previous sprockets 46 and 47'. A support bushing 47" is substantially similar to the bushing 47' for supporting the friction drive tire 50. In one modification, a bearing sleeve 48" is pressed into the sprocket 46". The sleeve 48" is also pressed onto the outer circumferential surface of a cam yoke roller 51. This cam yoke roller 51 is of conventional construction such as the cam follower No. CYR-3/4-S manufactured by McGill Corporation. This specific embodiment of the friction drive assembly 45" can be used with the roller assemblies 15 at the ends of the conveyor apparatus 10. In the preferred embodiment, these end drive assemblies bear the brunt of the driving load and therefore require a cam follower arrangement provided by the cam yoke roller 51 to avoid excessive load on the drive assemblies 45".

The drive arrangement between the roller assemblies 15 and the friction drive assemblies 45, 45' or 45" is protected by an outer cover 56 attached to the outer siderail 36. A similar cover, the inner cover 55, is also attached to the inner siderail 35 to protect the opposite end of the roller assemblies 15. The removal of the roller assemblies 15 or friction drive assemblies 45 requires removal of the inner cover 55 and the outer cover 56.

The friction drive assemblies 45, and particularly the sprocket 46 of these assemblies, are driven by a sprocket drive means 60. The sprocket drive means 60 includes a drive motor 61 attached to an interior bulkhead 42 as shown in FIGS. 2 and 7. The output of the drive motor 61 is through a gear box 62. A drive sprocket 65 is connected to and driven by the output shaft 63 of the gear box 62. An idler sprocket 67 is provided adjacent the drive sprocket 65 which is rotationally attached to an idler mount 69 through an idler tensioner 70. The idler tensioner 70 provides means for shifting the location of the idler sprocket 67 relative to the drive sprocket 65. To complete the driving capability of sprocket drive means 60, a drive chain 72 is engaged around the drive sprocket 65, across the idler sprocket 67 and along each of the sprockets 46 (or 46 or 46") of the friction drive assemblies 45. The drive chain 72 runs continuously to rotate each of the sprockets 46 as the drive sprocket 65 rotates. The idler sprocket 67 is used to adjust the tension within the drive chain 62, to avoid unnecessary chatter or unnecessary load on the chain. A wear plate 75 is mounted to a support brace 74 to provide a wear surface for contact with the drive chain 72 and to prevent vertical chatter of the drive chain 72.

The operation of the roller conveyor apparatus 10 of the present invention should be apparent from the foregoing description. When the drive motor 61 is energized, it causes the drive sprocket 65 to rotate. The teeth on the drive sprocket 65 engage the links of the drive chain 72 to cause the drive chain to move with the drive sprocket. The links of the drive chain 72 also engage the teeth of the sprocket 46 of each of the friction drive assemblies 45, causing the sprocket 48 to rotate with the drive sprocket 65. Rotation of the friction drive assemblies 45 is transmitted through the friction drive tire 50 to the drive wheel 25, by way of the frictional contact between these two components. Rotation of the drive wheel 25 then causes rotation of the tapered tubular roller 17 by way of their frictional contact. However, when one of the rollers is subjected to an excessive external torque, slip is provided between the roller 17 and the drive wheel 25, and between the friction drive tire 50 so that the affected roller 17 does not rotate.

With the configuration of the conveyor apparatus 10 of the present invention, individual rollers may be permitted to rotate while other rollers are stopped due to an excessive torque impacting that roller. Another important advantage of the present invention is that the particular configuration of roller assemblies 15 and friction drive assemblies 45 permits a smaller and more compact conveyor apparatus 10, which then permits use of this invention on sharper turning radii in smaller conveyor applications. The friction drive assemblies 45 and the sprocket drive means 60 can be situated directly beneath or underneath the conveyor rollers, and substantially beneath the continuous conveyor path, thereby reducing the overall size of the conveyor apparatus 10. Moreover, the present invention permits closer arrangement of adjacent roller assemblies 15 so that there is very little gap between the consecutive rollers, and consequently very little risk that an object traveling along the conveyor apparatus 10 can be lodged between rollers.

The coefficient of friction between the slippable components determines the forward drive applied to the object being conveyed. For instances a low coefficient of friction between the drive wheel 25 and the friction drive tire 50, permits only a low forward driving force to be applied to the conveyed object. An increase in forward driving force can be obtained by increasing the coefficient of friction between the slipping components, such as by increasing the spring force provided by the spring load assembly 27. Overdriving the friction drive assemblies 45 can result in slippage between the friction drive tire 50 and drive wheel 25, just as excessive torque applied to the roller assemblies 15 can cause similar slippage.

In a specific embodiment of the present invention, the tapered tubular rollers 17 are made of roller-swaged steel tubing. In certain applications, the roller 17 may be of stainless steel. The bushings, such as bushings 22, 24, and 40, can be formed of a typical engineering plastic compound to provide low friction and long wear. The axle 20 in the specific embodiment is composed of a ground and polished steel bar having an Ra finish that is compatible with the bushing material, in order to prevent excessive wear of the bushings. The drive wheel 25 is preferably formed of an engineering thermoplastic, although a metal, such as steel, can be used. It is important, however, that the drive wheel 25 has a surface having a sufficient coefficient friction between the drive wheel and the roller assembly, and between the drive wheel and the friction drive tire 50.

The friction drive tire 50 is preferably composed of a high durometer urethane, such as 92A durometer urethane. Other material may be suitable that provides adequate drive friction and resistance to wear. The sprockets, such as sprockets 46, drive sprocket 65, and idler sprocket 67, can also be composed of a high durometer urethane. It has been found that sprockets of this material provide damping for the sprocket/chain noise associated with normal sprocket drive.

The tooth form of the sprockets can be of the rack-tooth type, as shown in the view of FIG. 4. This rack-tooth form results in a lower pressure angle between the sprocket 46 and the drive chain 72 so that the chain stays engaged with the sprocket while pulling the required loads, even though the chain only wraps around the sprocket for a few circumferential degrees. For instance, as shown in FIG. 4, the drive chain contacts the teeth of the sprocket 46' along a chain contact arc 80. As is apparent from FIG. 4, only a few teeth of the sprocket are engaged with the links of the chain. Naturally, the amount of angular engagements between the chain 72 and the sprocket 46 is determined by the diameter of the sprocket 46 and the radius of the turn of the roller conveyor apparatus 10. A tighter turning radius will result in a greater length of chain contact 80 with the sprocket 46. However, the angle C subtended by the chain contact arc 80 is preferably less than approximately 90°. The tube insert 23 is preferably composed of a medium durometer urethane so that it can easily conform to the inner diameter of the tapered tubular roller 17.

Alternatively, the drive wheel 25 can be slip fit onto the axle 20, so that the axle 20 does not rotate with the drive wheel. In this configuration, the only forward driving force for the roller 17 is provided by the friction contact between the tube insert 23 and the drive wheel 25 as maintained by the spring load assembly 27.

An additional slipping feature can be provided by modifying the sprockets 46, 65, and 67, and the drive chain 72 to provide a belt-drive arrangement. In this instance, the sprockets would be replaced by drive disks having smooth circumferential surfaces, and the drive chain 72 would be replaced with a drive belt that engages on the drive disk. In this manner, slippage could be permitted between the drive belt and the drive disk.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

For instance, it is understood that the roller assemblies 15 and friction drive assemblies 45 can be employed in a straight-line conveyor apparatus. In addition, the rollers 17 can be of uniform outer diameter, rather than tapered as shown in FIG. 2. In this instance, the axle 20 would be horizontally oriented. However, the torque relief features provided by the drive wheel 25 and the friction drive tire 50 can be maintained, as well as the sprocket drive means 60 for driving the entire conveyor apparatus.

One benefit of the roller conveyor apparatus 10 as described above is that the greater lengths of driven rollers sections can be determined simply by increasing the length of the drive chain 72 being used. If a single drive motor 61 is sufficient to provide the driving force for a longer conveyor section, additional sprockets can be connected to the output shaft 63 for driving another drive chain engaged with another conveyor apparatus downstream or upstream from the conveyor apparatus 10.

It is further understood that if the drive wheel 25 and spring load assembly 27 are not used, the drive tire 50 of the friction drive assembly can be situated to directly frictionally contact and drive the tubular roller 17 itself. In this arrangement, the friction drive assemblies can be oriented at nearly any location along the length of the tubular roller without interfering with the function of the conveyor. The torque limiting feature of this arrangement is satisfied by the frictional contact between the rollers and the drive tires of their associated friction drive assemblies. This arrangement is a significant departure from known friction drive systems because mechanical components of these known systems are adapted to roller end driven applications only.

An additional variation within the scope of this invention is the combination of the driven member with the friction drive tire. That is, the sprocket 46 can be formed from high durometer urethane with the drive tire 50 integrally formed in the top face of the sprocket. If a drive disk is substituted for the sprocket configuration, a drive tire surface could likewise be formed in the top face of the drive disk.

What is claimed is:

1. A roller conveyor apparatus for conveying articles thereon, the apparatus comprising:
   a plurality of roller assemblies, each of said roller assemblies including;
      an elongated roller having a longitudinal axis; and
      means, including a first friction surface, for rotating said roller about said longitudinal axis;
   means for rotatably supporting each of said roller assemblies so that said roller of each of said roller assemblies form a continuous path for conveying articles thereon;
   a plurality of friction drive assemblies, one of said drive assemblies being associated with one of said plurality of roller assemblies, each of said plurality of friction drive assemblies including;
      a driven member having a second friction surface; and
      means for rotatably supporting said driven member so that said second friction surface is in frictional contact with said first friction surface of said one of said plurality of roller assemblies, whereby rotation of said driven member is frictionally transmitted to rotation of said means for rotating said roller through said frictional contact; and
   means for driving said driven member of each of said plurality of friction drive assemblies,
   wherein said means for rotating said roller includes:
      an axle supporting said elongated roller along said longitudinal axis;
      a drive wheel having a circumferential face forming said first friction surface and an end face having a third friction surface; and
      means for rotatably mounting said drive wheel on said axle adjacent one end of said elongated roller while maintaining said third friction surface in friction contact with said one end of said roller.

2. The roller conveyor apparatus of claim 1, wherein: said driven member includes a driven sprocket; and said means for driving includes:

a drive motor;

a drive sprocket rotatably engaged to said drive motor; and a drive chain engaged between said drive sprocket and said driven sprocket of at least one of said plurality of friction drive assemblies.

3. The roller conveyor apparatus of claim 2, wherein:

said driven sprocket includes several circumferentially disposed teeth; and said drive chain engages at least one of said several teeth in a contact arc of less than approximately 90°.

4. The roller conveyor apparatus of claim 1, wherein said means for rotating said roller further includes means for varying said friction contact between said third friction surface and said one end of said roller, thereby varying the amount of torque that must be applied between said roller and said drive wheel to cause said third friction surface to slip relative to said one end of said roller.

5. The roller conveyor apparatus of claim 4, wherein said means for varying the friction contact includes;

means for slidably engaging at least one of said roller and said drive wheel on said axle to permit relative motion between said roller and said drive wheel along said longitudinal axis of said roller;

means for variably forcing said roller and said drive wheel together along said axis.

6. The roller conveyor apparatus of claim 5, wherein said means for variably forcing includes:

a collar disposed about said axle adjacent the other end of said elongated roller;

a spring disposed about said axle between said collar and said other end of said roller; and means for fixing said collar to said axle at varying locations along said axle to vary the amount of compression of said spring between said collar and said other end of said roller.

7. The roller conveyor apparatus of claim 1, wherein said driven member includes an elastomeric tire.

8. The roller conveyor apparatus of claim 7, wherein said tire is composed of urethane.

9. The roller conveyor apparatus of claim 8, wherein said tire is composed of a 92A durometer urethane.

10. The roller conveyor apparatus of claim 1, wherein said driven member includes:

a driven sprocket; and an elastomeric tire engaged to said driven sprocket to rotate with said driven sprocket.

11. The roller conveyor apparatus of claim 1, wherein said elongated roller is a tapered roller.

12. The roller conveyor apparatus of claim 1, wherein said means for rotatably supporting said roller assemblies includes means for supporting the ends of said roller of each of said roller assemblies such that said roller assemblies form a curved path.

* * * * *